Nov. 9, 1954  D. W. OSMUN  2,693,858
PRESSURE LINE FEEDER
Filed Nov. 25, 1950  2 Sheets-Sheet 1
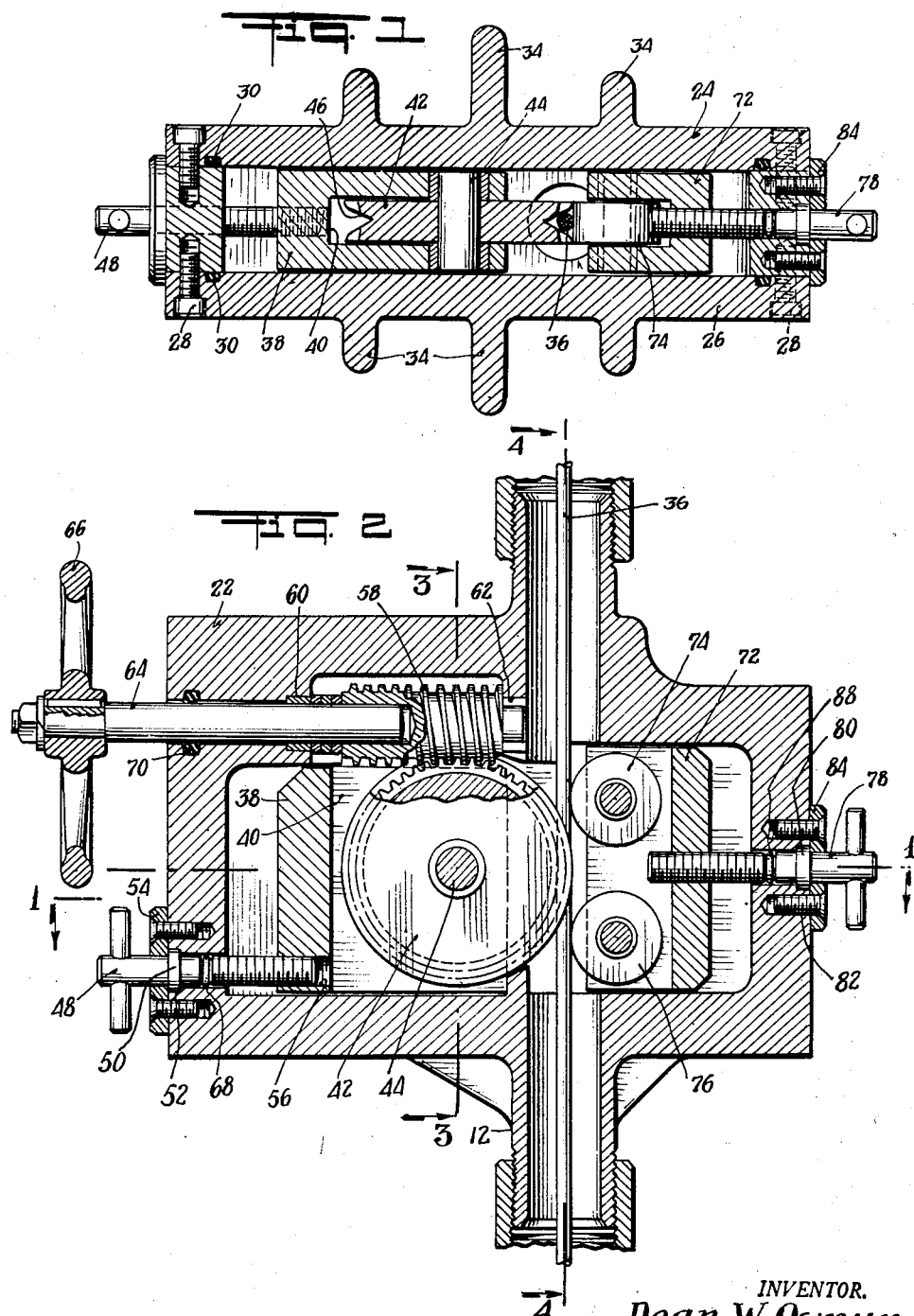
INVENTOR.
Dean W. Osmun
BY
Charles E. Lightfoot
ATTORNEY

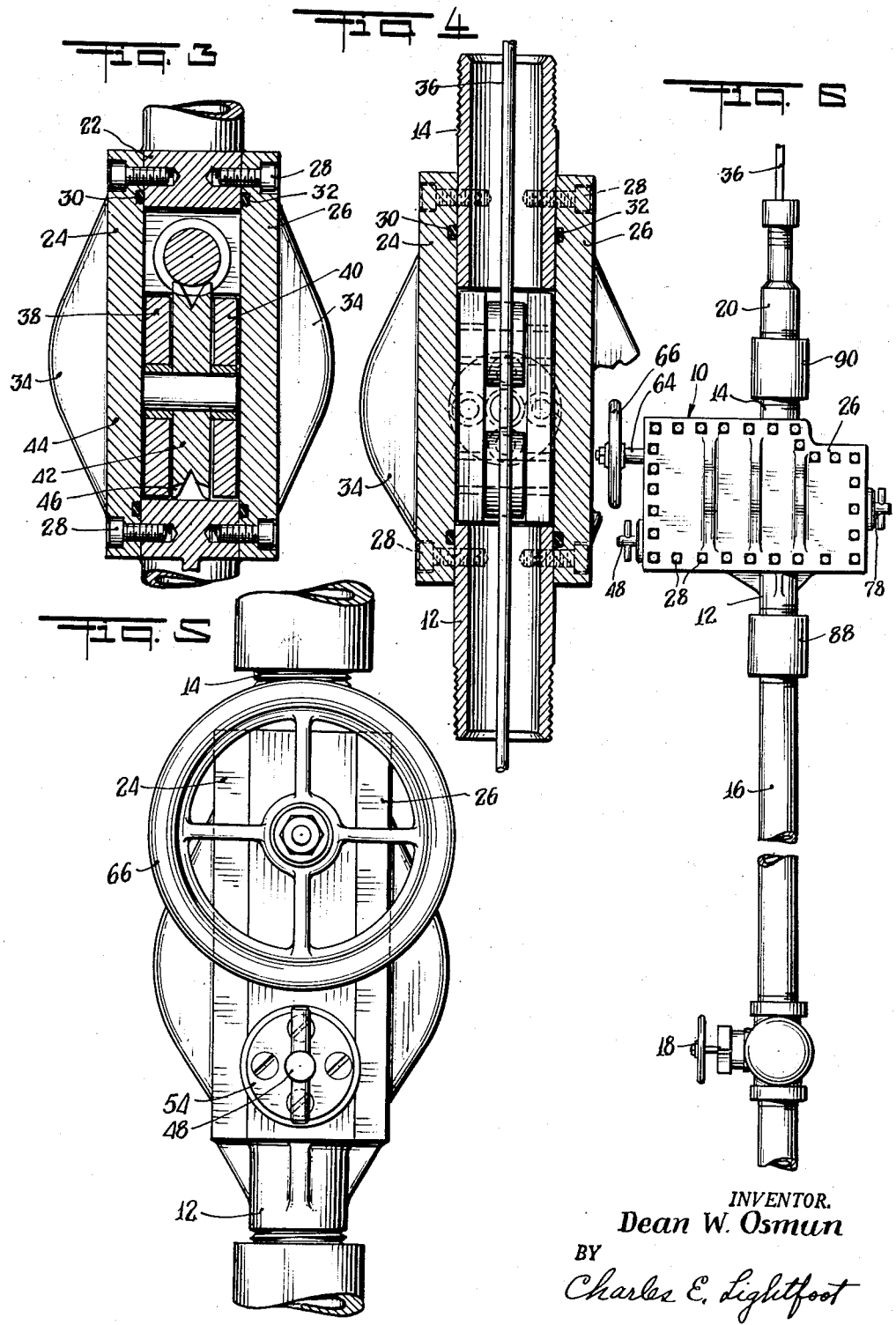

United States Patent Office 2,693,858
Patented Nov. 9, 1954

2,693,858

PRESSURE LINE FEEDER

Dean W. Osmun, Houston, Tex.

Application November 25, 1950, Serial No. 197,586

6 Claims. (Cl. 166—77)

This invention relates to a pressure line feeder, and more particularly to a mechanism for feeding a line into the bore of a well for lowering instruments or tools into the well while the same is flowing, or under pressure.

In the operation of oil wells it is frequently necessary to carry out surveying or testing operations in the well while the same is being operated or under pressure, by lowering instruments or tools into the well by means of a cable or the like. The introduction of such tools or instruments into the well while the same is under pressure introduces a serious problem for which no satisfactory solution has heretofore been found.

One method heretofore employed in carrying out such operations is to provide a section of pipe, sometimes called a lubricator, which is connected to the main valve above the well. The instrument or tool, attached to the line or cable is placed in this section of pipe with the valve turned off, and the line is passed through a stuffing box or line wiper which is attached to the upper end of the pipe section. By suitably weighting the instrument or tool the same may then be lowered into the well when the valve is opened, the weight pulling the line through the stuffing box or line wiper. Such a method, however, presents the difficulty that the weight required to pull the line through the stuffing box or line wiper must be so great that the section of pipe above the valve must be very long to accommodate the instrument and the weight required. The line wiper or stuffing box must, of course, be maintained sufficiently tight about the line to prevent leakage of oil or gas, and as a consequence a very heavy weight is needed to draw the line through the packing. Under some conditions the length of the weight required to pull the line through the stuffing box is so great that the use of the above mentioned apparatus becomes impracticable because of the extreme length of the pipe above the valve which must be employed.

An important object of the present invention is to provide line feeding mechanism by which the use of auxiliary weights in lowering an instrument or tool into a well which is under pressure may be eliminated.

Another object of the invention is the provision of line feeding mechanism adapted to be connected into a pipe above the main valve, and by which the line may be drawn through the stuffing box or line wiper to lower the instrument into the well.

A further object of the invention is to provide a pressure line feeder of the kind referred to, which may be inserted between the main valve and the line wiper, and through which the instrument may be inserted for lowering into the well.

A further object of the invention is the provision of a pressure line feeder which is adapted to be engaged or disengaged with the line, and including means whereby the line operating members may be adjusted to regulate the grip of the feeder on the line.

A still further object of the invention is to provide a pressure line feeder which is of simple design and durable construction, having few parts subject to excessive wear, and capable of withstanding the hard usage to which such mechanism is likely to be subjected.

For a more complete understanding of the nature and scope of the invention reference may be had to the following detailed description, taken in connection with the accompanying drawing, wherein—

Figure 1 is a horizontal cross-sectional view taken along the line 1—1 of Figure 2 looking in the direction indicated by the arrows, and showing the interior arrangement of the parts of the invention;

Figure 2 is a vertical central cross-sectional view of the invention in operating condition;

Figure 3 is a cross-sectional view taken along the line 3—3 of Figure 2, looking in the direction indicated by the arrows;

Figure 4 is a cross-sectional view taken along the line 4—4 of Figure 2, looking in the direction indicated by the arrows;

Figure 5 is an end elevational view of the invention; and

Figure 6 is a front elevational view showing the pressure line feeder assembly as applied to a well.

The pressure line feeder of the invention comprises a casing, designated generally by the numeral 10 having oppositely extending exteriorly threaded piping connections 12 and 14 for the purpose of connecting the feeder to the top of a section of pipe 16 attached to the main valve 18 of the well, and to a stuffing box or line wiper 20. The pipe section 16, valve 18 and line wiper 20 may be of conventional construction, forming no part of the present invention, except insofar as they are part of the assembly in which the feeder is located. The casing 10 is conveniently formed with a central, generally rectangular frame 22 to which side plates 24 and 26 of similar configuration are secured, by means of screws or other suitable fastening means as indicated at 28. Sealing means, such as O-rings 30 and 32 may be disposed in grooves extending about the plates 24 and 26, which rings bear against the central frame to form a fluid type seal between the side plates and frame of the casing. The side plates 24 and 26 may if desired be formed with exterior reinforcing ribs, such as those indicated at 34.

The interior of the casing forms with the pipe coupling extensions 12 and 14 a vertical passage through the casing through which a line such as a cable, indicated at 36 may pass, such line also passing through the stuffing box 20 and downwardly through the pipe section 16 and valve 18 to support the instrument or tool in the well.

Within the casing there is a sliding bearing block 38 movable toward and away from the line 36. This bearing block has a central vertically disposed slot 40 in which a gear wheel 42 is supported on bearing shaft 44. The gear wheel 42 has a peripheral groove 46, which may conveniently be of V-shape, and which is adapted to receive the line 36 when the wheel is moved into engagement with the line. The groove may be roughened or provided with teeth or the like to enable the same to more effectively grip the line if desired.

There is a rotatable shaft 48 which passes through the end of the casing adjacent to the bearing block 38, this shaft being provided with an external collar 50 which is received in a recess 52 in the casing, and the shaft also passes through a plate 54, which is secured to the casing over the recess 52, to retain the shaft rotatably in place. The shaft 48 is received in a threaded opening 56 in the bearing block 38, so that rotation of the shaft results in lateral movement of the bearing block in the casing, thus making it possible to adjust the gear wheel 42 toward and away from the line 36.

Above the gear wheel 42 a worm 58 is disposed in the casing on suitable bearings 60 and 62 respectively, this worm being in operative engagement with the teeth of the gear wheel for rotation of the same. The worm is operated by a shaft 64 extending through the adjacent end of the casing and connected axially to the worm, the shaft being provided with a hand wheel or the like, exteriorly of the casing for rotating the same. Both the shaft 48 and the shaft 64 may have packing means, such as those indicated at 68 and 70 respectively, by which the passage of fluid from the casing is prevented.

Due to the fact that the gear wheel 42 may rotate on its bearings upon movement of the bearing block 38 with reference to the worm 58, the gear wheel may be adjusted toward and away from the line 36 without rotation of the worm and independently of the same.

A second bearing block 72 is slidably carried in the casing opposite the block 38, and supports a pair of spaced rollers 74 and 76, which are adapted to be moved into engagement with the line 36 above and below the point of contact of the line with the gear wheel 42, so that the feeder mechanism will grip the line sufficiently tight to enable the line to be pulled through the casing by rotation of the gear wheel. The bearing block 72 is provided with a rotatable shaft 78, which is secured to the casing in the same manner as the shaft 48 previously described. Thus, shaft 78 has an external collar 80, which fits into a recess 82 in the end of the casing, and a cover plate 84 is secured to the outside of the casing to retain the collar in the recess. The shaft 78 may also have suitable packing, such as that indicated at 86, whereby leakage of fluid from the casing is prevented. It will be apparent that by rotation of the shaft 78 the bearing block 72 may be moved toward and away from the line 36, thus making possible the adjustment of the rollers 74 and 76 into and out of contact with the line.

In making use of the invention as described above, the same is incorporated in the assembly shown in Figure 6 wherein the pipe connection 12 of the feeder is connected to the pipe section 16 by means of a suitable coupling such as 88, and the pipe connection 44 is connected to the line wiper 20 by a similar coupling 90. The line 36 is passed through the line wiper and through the feeding mechanism into the pipe section 16. By removing the coupling 88, after the valve 18 has been closed, the instrument or tool may be connected to the line and inserted in the pipe section. The line feeder and wiper may then be replaced by reconnecting the coupling 88 and the valve 18 can be opened. By suitably adjusting the bearing blocks 38 and 72 in the casing the gear wheel 42 and the rollers 74 and 76 may be moved into gripping engagement with the line, and upon rotation of the hand wheel 66 the line may be drawn through the wiper into the casing, so that the tool or instrument may pass downwardly through the valve 18 into the well. Thus, the cable may be drawn into the well regardless of the tightness of the packing about the line in the stuffing box or line wiper, and entirely independently of the weight of the instrument or tool which is being lowered.

When it is desired to withdraw the tool or instrument from the well the gear wheel 42 and rollers 74 and 76 may be backed off from the line and the line then withdrawn from the well by the use of the customary reeling mechanism. It will also be apparent that the mechanism as described may be used with a line of any character or diameter, and that the mechanism may be adjusted to operate equally as well with lines of different sizes. Because of the arrangement of the rollers 74 and 76 above and below the point of contact of the gear wheel 42 with the line the line may be caused to bend slightly about the gear wheel and the rollers, thus affording a greater degree of gripping on the line and assuring that the same will be pulled evenly and steadily through the line wiper.

In inserting the tool or instrument into the assembly the line wiper 20 may be removed from the casing, and the instrument attached to the lower end of the line. The instrument may then be inserted through the feeder to the full diameter of the pipe connections 12 and 14. The line wiper may then be replaced on the casing and the gear wheel and rollers moved inwardly into engagement with the line.

It will thus be seen that the invention as described above provides a pressure line feeder which makes possible the lowering of tools and instruments into a well which is under pressure, without the use of weights of any kind, and which operates independently of the tightness of the packing in the line wiper.

The invention has been disclosed herein in connection with a specific embodiment of the same, but it will be understood that this is intended by way of illustration only, and that numerous modifications can be made in the structure and arrangement of the various parts without departing from the spirit of the invention, and within the scope of the appended claims.

What is claimed and desired to secure by Letters Patent is:

1. A pressure line feeder comprising a casing, means connecting the feeder casing with a well tubing and a line wiper in intercommunicating relationship therewith, said feeder casing having a passageway therethrough in alignment with said tubing and wiper, bearing blocks movably disposed in the feeder casing on opposite sides of said passageway, means cooperable with each of said blocks and said feeder casing for moving said blocks toward and away from said passageway, a gear rotatably mounted on one of said blocks and movable therewith into and out of frictional engagement with a line in said passageway, means rotatably mounted on the other of said blocks and movable therewith into and out of frictional engagement with said line, and means rotatably mounted on the feeder casing and cooperable with said gear to rotate said gear.

2. A pressure line feeder comprising a casing, means connecting the feeder casing with a well tubing and a line wiper in intercommunicating relationship therewith, said feeder casing having a passageway therethrough in alignement with said tubing and wiper, bearing blocks movably disposed in the feeder casing on opposite sides of said passageway, a gear rotatably mounted on one of said blocks, rotatable means mounted on the other of said blocks, means cooperable with each of said blocks and said feeder casing and operable to move said blocks toward said passageway to grippingly engage a line in said passageway between said gear and said rotatable means and means rotatably mounted on said feeder casing and cooperable with said gear to rotate said gear.

3. A pressure line feeder comprising a casing, means connecting the feeder casing with a well tubing and a line wiper in intercommunicating relationship therewith, said feeder casing having a passageway therethrough in alignment with said tubing and wiper, bearing blocks movably disposed in the feeder casing on opposite sides of said passageway, a gear rotatably mounted on one of said blocks, rotatable means mounted on the other of said blocks, means cooperable with each of said blocks and said feeder casing and operable to move said blocks toward and away from said passageway to move said gear and said rotatable means into and out of gripping engagement with a line in said passageway, and means rotatably mounted on said feeder casing and cooperable with said gear to rotate said gear.

4. A pressure line feeder comprising a casing, means connecting the feeder casing with a well tubing and a line wiper in intercommunicating relationship therewith, said feeder casing having a passageway therethrough in alignment with said tubing and wiper, bearing blocks movably disposed in the feeder casing on opposite sides of said passageway, a gear member rotatably mounted on one of said blocks and having external, peripherally-spaced teeth, rotatable means mounted on the other of said blocks, means cooperable with each of said blocks and said feeder casing and operable to move said blocks toward and away from said passageway to move said member and said rotatable means into and out of gripping engagement with a line in said passageway, said gear member having an external peripheral groove positioned to receive said line, and means rotatably mounted on said feeder casing and cooperable with said teeth to rotate said member.

5. A pressure line feeder comprising a casing, means connecting the feeder casing with a well tubing and a line wiper in intercommunicating relationship therewith, said feeder casing having a passageway therethrough in alignment with said tubing and wiper, bearing blocks movably disposed in the feeder casing on opposite sides of said passageway, a gear member rotatably mounted on one of said blocks and having external, peripherally-spaced teeth, rotatable means mounted on the other of said blocks, means cooperable with each of said blocks and said feeder casing and operable to move said blocks toward and away from said passageway to move said member and said rotatable means into and out of gripping engagement with a line in said passageway and means rotatably mounted on said feeder casing and cooperable with said teeth in all positions of said member to rotate said member.

6. A pressure line feeder comprising a casing, means connecting the feeder casing with a well tubing and a line wiper in intercommunicating relationship therewith, said feeder casing having a passageway therethrough in alignment with said tubing and wiper, bearing blocks movably disposed in the feeder casing on opposite sides of said passageway, a gear member rotatably mounted on one of said blocks and having external, peripherally-spaced teeth, rotatable means mounted on the other of said blocks, means cooperable with each of said blocks and said feeder casing and operable to move said blocks toward and away from said passageway to move said member and said rotatable means into and out of gripping engagement with a line in said passageway, a worm rotatably mounted on said feeder casing and in intermeshing engagement with said teeth in all positions of said member, and means for rotating said worm.

References Cited in the file of this patent

UNITED STATES PATENTS

| Number | Name | Date |
|---|---|---|
| 1,849,924 | Hall et al. | Mar. 15, 1932 |
| 2,144,403 | Davidson | Jan. 17, 1939 |
| 2,262,364 | Hugel et al. | Nov. 11, 1941 |